US011909098B2

(12) United States Patent
Huang et al.

(10) Patent No.: US 11,909,098 B2
(45) Date of Patent: Feb. 20, 2024

(54) ANTENNA STRUCTURE AND HIGH-FREQUENCY WIRELESS COMMUNICATIONS TERMINAL

(71) Applicant: VIVO MOBILE COMMUNICATION CO., LTD., Guangdong (CN)

(72) Inventors: Huanchu Huang, Dongguan (CN); Yijin Wang, Dongguan (CN); Xianjing Jian, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 363 days.

(21) Appl. No.: 17/355,506

(22) Filed: Jun. 23, 2021

(65) Prior Publication Data

US 2021/0320394 A1 Oct. 14, 2021

Related U.S. Application Data

(63) Continuation-in-part of application No. PCT/CN2019/126193, filed on Dec. 18, 2019.

(30) Foreign Application Priority Data

Dec. 28, 2018 (CN) ......................... 201811627261.0

(51) Int. Cl.
*H01Q 1/24* (2006.01)
*H01Q 1/22* (2006.01)

(52) U.S. Cl.
CPC ........... *H01Q 1/2283* (2013.01); *H01Q 1/243* (2013.01)

(58) Field of Classification Search
CPC ...... H01Q 1/2283; H01Q 1/243; H01Q 5/378; H01Q 1/523; H01Q 9/0414; H01Q 21/24;
(Continued)

(56) References Cited

U.S. PATENT DOCUMENTS 10,601,144 B2 * 3/2020 Kamo .................. H01Q 21/005
2012/0299783 A1 * 11/2012 Lee .......................... H01Q 1/36
343/700 MS (Continued)

FOREIGN PATENT DOCUMENTS

CN 104993245 A 10/2015
CN 205282643 U 6/2016

(Continued)

OTHER PUBLICATIONS

Supplementary European Search Report regarding Patent Application No. 19903098.2-1205/3905428; PCT/CN2019/126193, dated Feb. 2, 2022.

(Continued)

*Primary Examiner* — Jean B Jeanglaude
(74) *Attorney, Agent, or Firm* — Harness, Dickey & Pierce, P.L.C.

(57) ABSTRACT

An antenna structure includes: a metal plate disposed with a first accommodating groove; an antenna unit including a radiation piece and a coupling piece; and a radio frequency module disposed on a first side of the metal plate and electrically connected to the radiation piece. At least one of the radiation piece and the coupling piece is disposed in the first accommodating groove. The radiation piece is insulated from the metal plate, the coupling piece is insulated from the metal plate, the radiation piece is disposed opposite to the coupling piece and insulated from the coupling piece. The radiation piece is located between the coupling piece and the radio frequency module. The radiation piece is configured to generate a resonance in a first preset band, and the coupling piece is configured to expand the bandwidth of the resonance in the first preset band.

20 Claims, 7 Drawing Sheets

(58) Field of Classification Search
CPC ............ H01Q 1/44; H01Q 21/08; H01Q 1/24; H01Q 5/10; H01Q 5/28; H01Q 5/307; H01Q 23/00
USPC .......................................................... 343/702
See application file for complete search history.

(56) References Cited

U.S. PATENT DOCUMENTS

| | | | |
|---|---|---|---|
| 2016/0056541 A1 | 2/2016 | Tageman et al. | |
| 2018/0358686 A1 | 12/2018 | Park | |
| 2019/0386396 A1* | 12/2019 | Sato ..................... | H01Q 21/005 |

FOREIGN PATENT DOCUMENTS

| | | |
|---|---|---|
| CN | 106921023 A | 7/2017 |
| CN | 207490099 U | 6/2018 |
| CN | 108417995 A | 8/2018 |
| CN | 108987943 A | 12/2018 |
| CN | 109066055 A | 12/2018 |
| CN | 109728405 A | 5/2019 |
| WO | WO-2016190999 A1 | 12/2016 |
| WO | WO-2018095535 A1 | 5/2018 |

OTHER PUBLICATIONS

International Search Report and Written Opinion of the International Searching Authority regarding International Patent Application No. PCT/CN2019/126193, dated Mar. 19, 2020. Translation provided by Bohui Intellectual Property.

First Office Action regarding Chinese Patent Application No. 201811627261.0, dated Mar. 12, 2020. Translation provided by Bohui Intellectual Property.

Second Office Action regarding Chinese Patent Application No. 201811627261.0, dated Dec. 2, 2020. Translation provided by Bohui Intellectual Property.

Third Office Action regarding Chinese Patent Application No. 201811627261.0, dated Mar. 29, 2021. Translation provided by Bohui Intellectual Property.

"Novel Integrated Design of Dual-Band Dual-Polarization mm-Wave Antennas in Non-mm-Wave Antennas (AiA) for a 5G Phone with a Metal Frame," Huang-Chu Huang, et al., 2019 International Workshop on Antenna Technology, dated Mar. 6, 2019.

* cited by examiner

ANTENNA STRUCTURE AND HIGH-FREQUENCY WIRELESS COMMUNICATIONS TERMINAL

CROSS-REFERENCE OF RELATED APPLICATIONS

This application is a Bypass Continuation-in-part Application of PCT/CN2019/126193 filed on Dec. 18, 2019, which claims priority to Chinese Patent Application No. 201811627261.0 filed on Dec. 28, 2018, which are incorporated herein by reference in their entirety.

TECHNICAL FIELD

This disclosure relates to the field of communications technologies, and in particular, to an antenna structure and a high-frequency wireless communications terminal.

BACKGROUND

With the advent of the 5-th generation mobile communications (5G) era and development of future communications, millimeter-wave technologies and applications play a key role in satisfying the demand for wireless communication with increasingly fast data transmission rates. Therefore, millimeter-wave antennas and designs thereof are gradually being introduced to mobile terminals such as mobile phones, tablets, and even notebook computers. Design and performance of millimeter-wave antennas have become a hot topic for related antenna engineers and electromagnetic researchers.

SUMMARY

An embodiment of this disclosure provides an antenna structure, including:

a metal plate, where a first accommodating groove is disposed in the metal plate;

an unit, where the antenna unit includes a radiation piece and a coupling piece; and a radio frequency module, where the radio frequency module is disposed on a first side of the metal plate, and the radio frequency module is electrically connected to the radiation piece; where at least one of the radiation piece and the coupling piece is disposed in the first accommodating groove, the radiation piece is insulated from the metal plate, the coupling piece is insulated from the metal plate, the radiation piece and the coupling piece are disposed opposite each other and insulated from each other, the radiation piece is located between the coupling piece and the radio frequency module, the radiation piece is configured to generate a resonance in a first preset band, and the coupling piece is configured to expand a bandwidth of the resonance in the first preset band.

DESCRIPTION OF EMBODIMENTS

Figure 1:
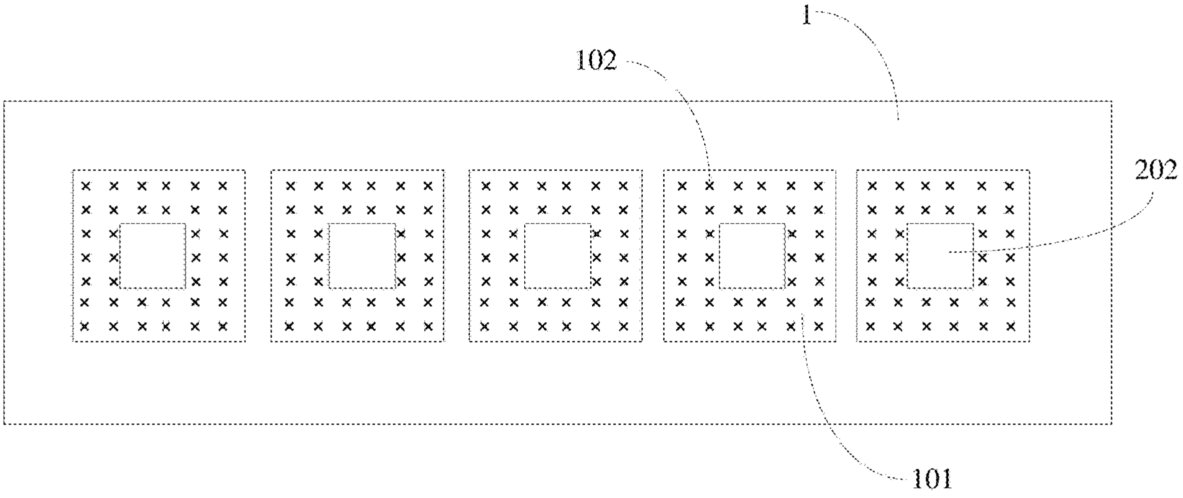
FIG. 1 is a first schematic diagram of a coupling piece in a first accommodating groove according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure shall fall within the protection scope of this disclosure.

In the related arts, mainstream millimeter-wave antennas are often in the form of antenna in package (AiP). The antenna in package and an existing antenna, for example, a cellular antenna or a non-cellular antenna, are often discretely disposed. As a result, an available space of the existing antenna is squeezed, which degrades performance of the antenna, increases an overall volume of the system, and reduces overall product competitiveness.

An embodiment of this disclosure provides an antenna structure, as shown in FIG. 1 to FIG. 9. The antenna structure includes:

a metal plate 1, where a first accommodating groove 101 is disposed in the metal plate 1; and optionally, a depth of the first accommodating groove 101 is equal to a thickness of the metal plate 1, which means the first accommodating groove 101 is a groove running through the metal plate 1;

an antenna unit, where the antenna unit includes a radiation piece 201 and a coupling piece 202; and a radio frequency module, where the radio frequency module is disposed on a first side of the metal plate 1, the radio frequency module is electrically connected to the radiation piece 201, the first side is a side on which the first accommodating groove is disposed, and when the first side of the metal plate 1 faces towards inside of a terminal, the radio frequency module is disposed inside the terminal; where at least one of the radiation piece 201 and the coupling piece 202 is disposed in the first accommodating groove 101, the radiation piece 201 is insulated from the metal plate 1, the coupling piece 202 is insulated from the metal plate 1, the radiation piece 201 and the coupling piece 202 are disposed opposite each other and insulated from each other, the radiation piece 201 is located between the coupling piece 202 and the radio frequency module, the radiation piece 201 is configured to generate a resonance in a first preset band, and the coupling piece 202 is configured to expand a bandwidth of the resonance in the first preset band. In other words, the coupling piece is configured to increase an operating bandwidth of the radiation piece.

Based on the antenna structure in this embodiment of this disclosure, an accommodating groove is disposed in the metal plate 1, and at least one of the radiation piece 201 and the coupling piece 202 of the antenna unit is disposed in the accommodating groove, and the radio frequency module electrically connected to the radiation piece 201 is disposed on a side of the metal plate 1. In this way, the antenna unit is integrated on the metal plate 1, thereby reducing a space occupied by an antenna in the terminal. In addition, this disclosure can increase a wireless diversity connection capability of the antenna, and reduce a probability of communication disconnection, improving a communication effect and user experience. This disclosure also helps implement a multiple input multiple output (MIMO) function, to increase a data transmission rate, improving user wireless experience and product competitiveness.

Optionally, there are a plurality of first accommodating grooves 101, the plurality of first accommodating grooves 101 are spaced apart from each other, there are a plurality of antenna units corresponding to the plurality of first accommodating grooves 101, and at least one of the radiation piece 201 and the coupling piece 202 of each antenna unit is disposed in the first accommodating groove 101 corresponding to the antenna unit.

The plurality of antenna units form an array antenna, so that the antenna structure in this embodiment of this disclosure can operate in a wide band, providing a better wireless band coverage capability and user wireless experience.

Optionally, an area of the radiation piece 201 is larger than or equal to an area of the coupling piece 202.

In addition, the radiation pieces 201 and the coupling pieces 202 of the plurality of antenna units may be integrated on the metal plate 1 in the following manners.

Manner 1: The coupling pieces 202 are fixed in the first accommodating groove 101 disposed in the metal plate 1, and the radiation pieces 201 are fixed on the radio frequency module.

Optionally, as shown in FIG. 1, a first insulating dielectric layer 102 is disposed in the first accommodating groove 101, and the coupling pieces 202 are disposed in the first insulating dielectric layer 102.

Figure 2:
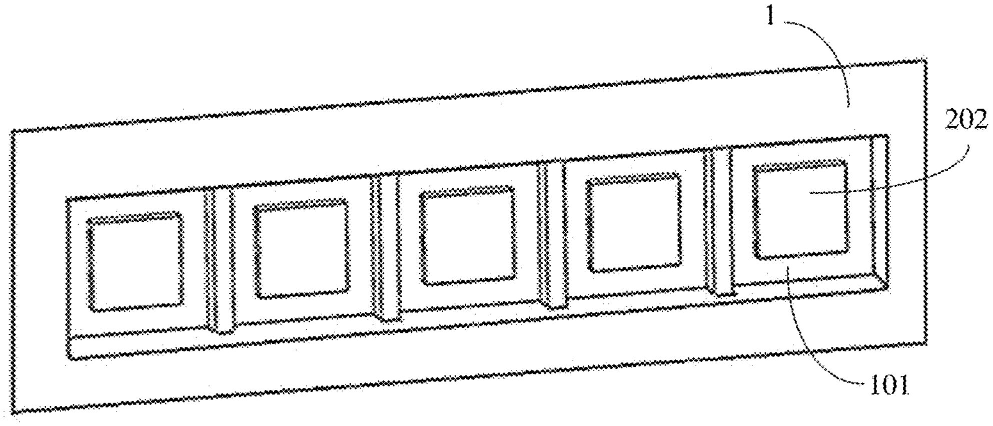
FIG. 2 is a second schematic diagram of a coupling piece in a first accommodating groove according to an embodiment of this disclosure.
Figure 3:
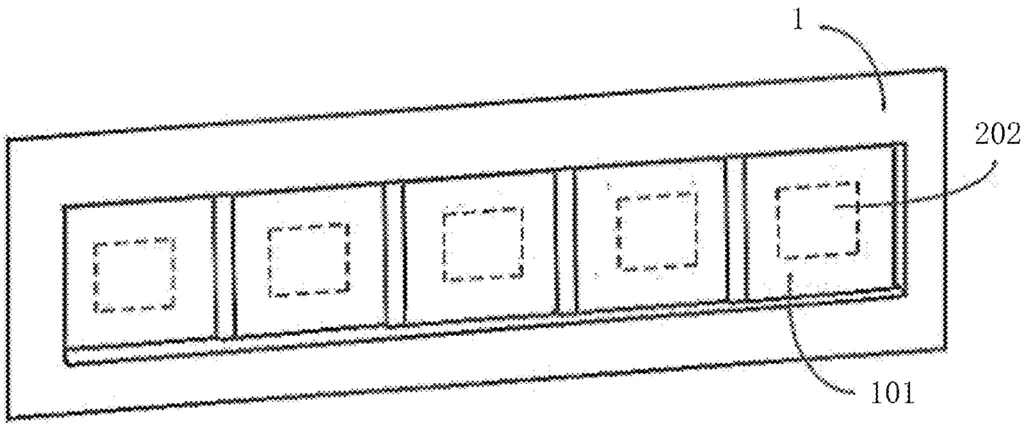
FIG. 3 is a schematic diagram of the first accommodating groove shown in FIG. 2 filled with an insulating medium.

For example, before the first accommodating groove 101 is filled with an insulating medium, as shown in FIG. 2, a thickness of the coupling piece 202 is less than a thickness of the metal plate 1, and a portion of the metal plate 1 between adjacent first accommodating grooves 101 forms a metal spacer structure. Optionally, a thickness of the metal spacer structure is less than the thickness of the metal plate 1 and larger than the thickness of the coupling piece 202. On the basis of FIG. 2, after the insulating medium is filled into the first accommodating groove 101, as shown in FIG. 3, the first insulating dielectric layer 102 filled in the first accommodating groove 101 may be flush with an outer surface of portions of the metal plate 1 (a surface on a side on which the radio frequency module is not disposed), and flush with the metal spacer structure formed by the metal plate between first accommodating grooves 101.

Figure 4:
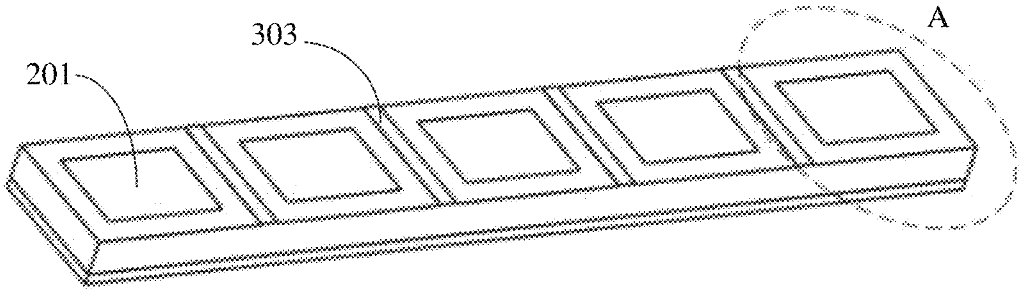
FIG. 4 is a schematic diagram of a radiation piece disposed on a radio frequency module according to an embodiment of this disclosure.
Figure 5:
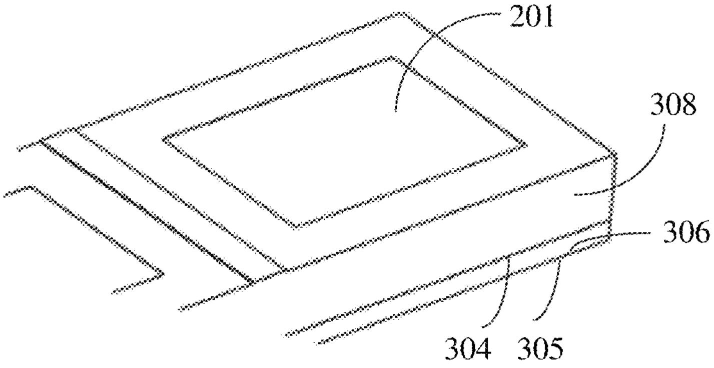
FIG. 5 is a local enlarged view of the part enclosed by a dashed-line box A in FIG. 4.

Optionally, as shown in FIG. 4 and FIG. 5, a second insulating dielectric layer 308 is disposed on the radio frequency module, the radiation pieces 201 are disposed on the second insulating dielectric layer 308, and the radiation pieces 201 are spaced apart from each other.

Optionally, as shown in FIG. 4, the antenna structure in this embodiment of this disclosure further includes a metal member 303, where the metal member 303 is disposed on the second insulating dielectric layer 308 and located between two adjacent radiation pieces 201, and the metal member 303 is grounded and in contact with the metal plate 1, to decrease coupling between adjacent antenna units and increase isolation between the antenna units.

For example, the metal members 303 spaced apart from each other on the second insulating dielectric layer 308 are in contact with the metal plate 1, so that the metal members 303 are electrically connected to the metal plate 1, and when the metal members 303 are grounded, the metal plate 1 is also grounded. In this way, the metal plate 1 between the adjacent first accommodating grooves 101 can form a spacer ground, thereby decreasing the coupling between the adjacent antenna units and increasing the isolation between the antenna units.

Optionally, a pin is disposed on a surface of the metal member 303, and the pin is in contact with the metal plate 1; or a convex hull is disposed on a surface of portions of the metal plate 1 between the adjacent first accommodating grooves 101, and the convex hull is in contact with the metal member 303, so that the metal member 303 can be better electrically connected to the metal plate 1.

Manner 2:

Optionally, there are a plurality of antenna units, a second insulating dielectric layer 308 is disposed on the radio frequency module, the coupling pieces 202 are disposed in the second insulating dielectric layer 308 and spaced apart from each other, the radiation pieces 201 are disposed in the second insulating dielectric layer 308 and spaced apart from each other, and the radio frequency module is installed in the first accommodating groove 101. A thickness of the radio frequency module may be equal to a depth of the first accommodating groove 101, so that a surface of the radio frequency module can be flush with an inner surface of portions of the metal plate 1.

Figure 7:
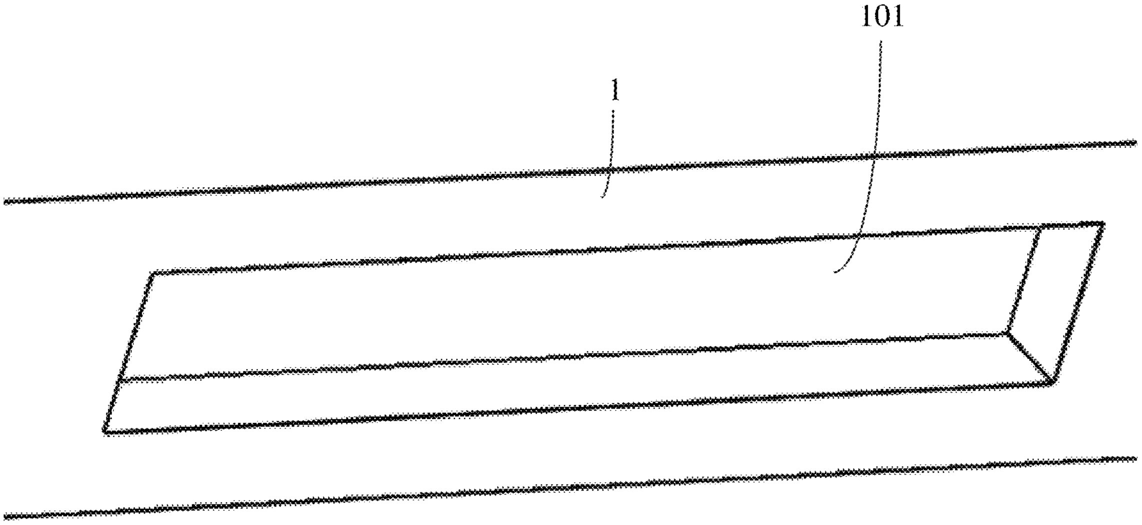
FIG. 7 is a schematic diagram of a first accommodating groove as a long groove disposed on a metal plate according to an embodiment of this disclosure.
Figure 8:
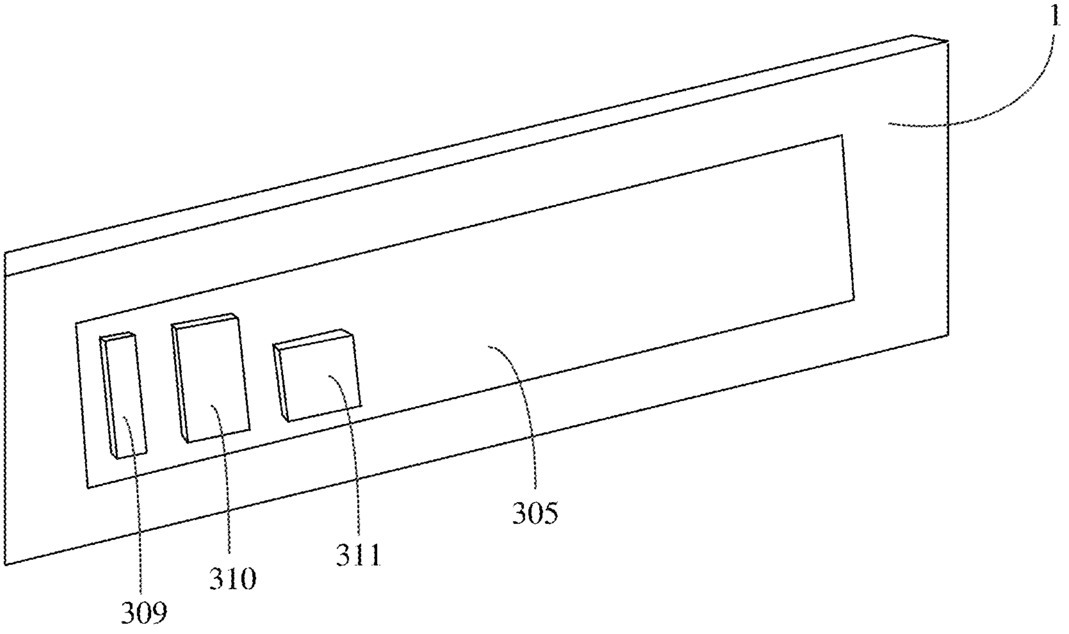
FIG. 8 is a schematic diagram showing an effect of mounting a radio frequency module into the first accommodating groove shown in FIG. 7 according to an embodiment of this disclosure.

When the radiation pieces 201 and the coupling pieces 202 are all fixed in the second insulating dielectric layer 308 on the radio frequency module, the first accommodating groove 101 on the metal plate 11 is a large long groove (as shown in FIG. 7) and can accommodate the entire radio frequency module. In addition, an effect of installing the radio frequency module into the first accommodating groove 101 shown in FIG. 7 is shown in FIG. 8.

Optionally, the antenna structure in this embodiment of this disclosure further includes a metal member 303, where the metal member 303 is disposed on the second insulating dielectric layer 308 and located between two adjacent radiation pieces 201, and the metal member 303 is grounded and in contact with the metal plate 1.

The metal members 303 separate the plurality of radiation pieces 201 from each other, and the metal members 303 spaced apart from each other on the second insulating dielectric layer 308 are in contact with the metal plate 1, so that the metal members 303 are electrically connected to the metal plate 1, and when the metal members 303 are grounded, the metal plate 1 is also grounded. In this way, the metal plate 1 between the adjacent first accommodating grooves 101 can form a spacer ground, thereby decreasing the coupling between the adjacent antenna units and increasing the isolation between the antenna units.

Optionally, a pin is disposed on a surface of the metal member 303, and the pin is in contact with the metal plate 1; or a convex hull is disposed on a surface of portions of the metal plate 1 between the adjacent first accommodating grooves 101, and the convex hull is in contact with the metal member 303, so that the metal member 303 can be better electrically connected to the metal plate 1.

Manner 3: The radiation pieces 201 and the coupling pieces 202 are all fixed in the first accommodating groove 101 disposed in the metal plate 1.

Optionally, a first insulating dielectric layer 102 is disposed in the first accommodating groove 101, and the radiation pieces 201 are disposed in the first insulating dielectric layer 102. The first insulating dielectric layer 102 filled in the first accommodating groove 101 may be flush with an outer surface of portions of the metal plate 1 (that is, a surface on which the radio frequency module is not disposed).

Optionally, one coupling piece 202 is disposed in the first insulating dielectric layer 102 in one first accommodating groove 101, and the coupling piece 202 and the radiation piece 201 that belong to a same antenna unit are located in a same first accommodating groove 101. To be specific, the radiation piece 201 and the coupling piece 202 that belong to the same antenna unit are disposed in the first insulating dielectric layer 102 in one first accommodating groove 101.

In addition, when the radiation pieces 201 and the coupling pieces 202 are integrated on the metal plate 1 in this manner, the radiation pieces 201 and the coupling pieces 202 may be disposed as a portion of the metal plate 1. To be specific, layers are designed in a specified zone on the metal plate 1, so that a plurality of antenna units can be formed by the metal plate 1 in this zone, and a portion of the metal plate 1 serves as a radiation piece 201 of the antenna.

The metal plate 1 may be a portion of a metal housing of the terminal, so that the arrangement of the antenna units does not affect metal texture of the terminal, and the antenna units are well compatible with products with large metal coverage.

Figure 6:
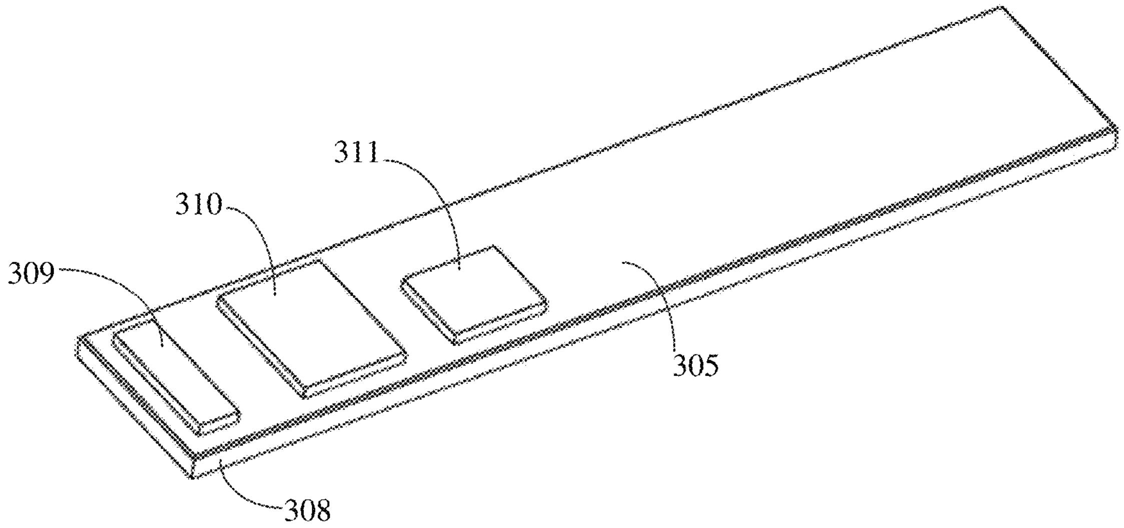
FIG. 6 is a schematic structural diagram of a radio frequency module according to an embodiment of this disclosure.

Optionally, as shown in FIG. 6, the radio frequency module includes a radio frequency integrated circuit 310 and a power management integrated circuit 311. The radio frequency integrated circuit 310 is electrically connected to the radiation piece 201 and the power management integrated circuit 311 respectively. A board-to-board (BTB) connector 309 may further be disposed in the radio frequency module, and configured for intermediate-frequency signal connection between the radio frequency module and a main board of the terminal. When there are a plurality of antenna units in this embodiment of this disclosure, the radio frequency integrated circuit 310 is electrically connected to the radiation piece 201 of each antenna unit, so that a signal received by the radiation piece 201 finally converges on the radio frequency integrated circuit 310 through a transmission line connected to all the radiation pieces 201.

Optionally, as shown in FIG. 5, the radio frequency module further includes a first ground layer 304, a second ground layer 305, and a third insulating dielectric layer 306. The third insulating dielectric layer is located between the first ground layer 304 and the second ground layer 305. The radio frequency integrated circuit 310 and the power management integrated circuit 311 are located on the second ground layer 305, the radio frequency integrated circuit 310 is electrically connected to the power management integrated circuit 311 through a first wire, and the radio frequency integrated circuit 310 is electrically connected to the radiation piece 201 through a second wire. The first wire and the second wire are located in the third insulating dielectric layer. Arranging the radio frequency integrated circuit 310 on the ground layer of the radio frequency module can minimize losses of an antenna signal on a path. In addition, the first ground layer 304 and the second ground layer 305 may be electrically connected through a feed hole or a through hole.

It should be noted that after the radio frequency module is disposed on a side of the metal plate 1, the first ground layer 304 of the radio frequency module is connected to an inner surface of portions of the metal plate 1 (a surface on which the radio frequency module is disposed), so that a reflector can be formed for the antenna unit, to improve a gain of the antenna. This can also make the antenna unit less sensitive to the system environment behind the metal plate 1, so that more devices can be integrated on the terminal to implement more functions, thereby enhancing product competitiveness.

Figure 9:
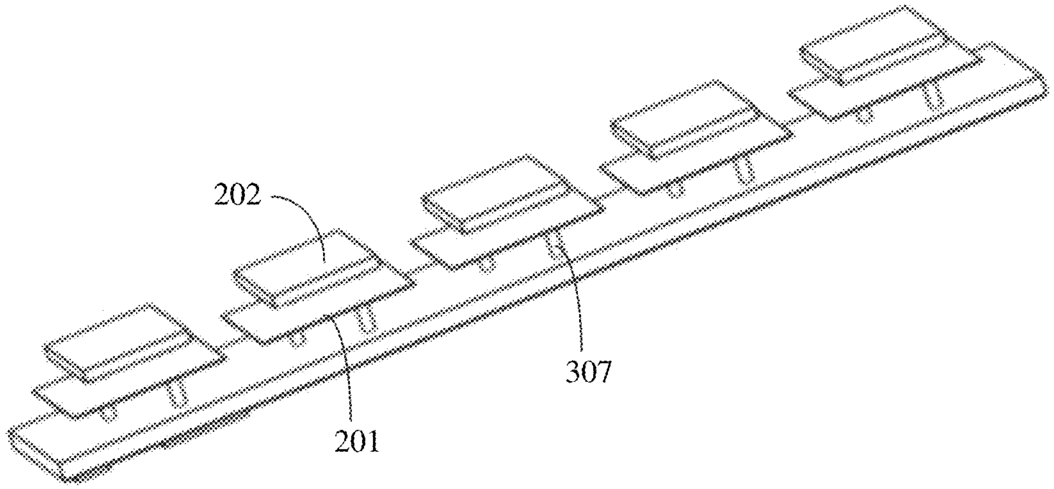
FIG. 9 is a schematic diagram of a connection between a feed pin and a radiation piece according to an embodiment of this disclosure.

Optionally, as shown in FIG. 9, a feed pin 307 is disposed on the radio frequency module, and the feed pin 307 is electrically connected to the radiation piece 201. It should be noted that the feed pin 307 may be integrated with the metal plate 1, or integrated with the radio frequency module, or may be used as a separate discrete device for feeding a feed signal.

For example, when the radiation piece 201 and the coupling piece 202 are integrated on the metal plate 1 by using the foregoing manner 1 or 3, a feed hole 103 needs to be disposed in the insulating medium between the coupling piece 202 and the radiation piece 201, so that the feed pin 307 can be electrically connected to the radiation piece 201 after passing through a feed hole 103, where a diameter of the feed hole is greater than a diameter of the feed pin 307.

In addition, when the foregoing manner 2 is used for the radiation piece 201 and the coupling piece 202, there is no need to provide the feed pin 307 to be electrically connected to the radiation piece 201, and wires are directly arranged in an insulating layer of the radio frequency module. If necessary, a feed hole may be disposed, so as to electrically connect the radio frequency module and the radiation piece 201.

In addition, the feed pin 307 may be disposed on the first ground layer 304. For example, the feed pin 307 is located in the third insulating dielectric layer 306 and is electrically connected to the radio frequency integrated circuit 311 located on the second ground layer 305 through a wire in the third insulating dielectric layer 306, a first feed hole is disposed on the first ground layer 304, and a diameter of the first feed hole is greater than a diameter of the feed pin 307, which means the feed pin 307 is located in the first feed hole but not in contact with the first ground layer 304.

Optionally, the radiation piece 201 and the coupling piece 202 are square, and the first accommodating groove 101 matches the radiation piece 201 and the coupling piece 202, allowing the radiation piece 201 and the coupling piece 202 to be installed in the first accommodating groove 101. It can be understood that the radiation piece 201 and the coupling piece are not limited to being square, but may alternatively be in other shapes, for example, a circle, a regular triangle, a regular pentagon, or a regular hexagon.

Optionally, the radiation piece 201 and the coupling piece 202 are disposed in parallel, and a straight line passing through a center of symmetry of the radiation piece 201 and a center of symmetry of the coupling piece is perpendicular to the radiation piece 201, so that the antenna unit formed by the radiation piece 201 and the coupling piece 202 is in a symmetrical structure, and an array antenna composed of the antenna units can operate in a wide band, so as to provide a better wireless frequency coverage capability and user wireless experience, and maintain the same or approximate performance in spatially symmetrical or mapped directions during beam scanning.

Figure 12:
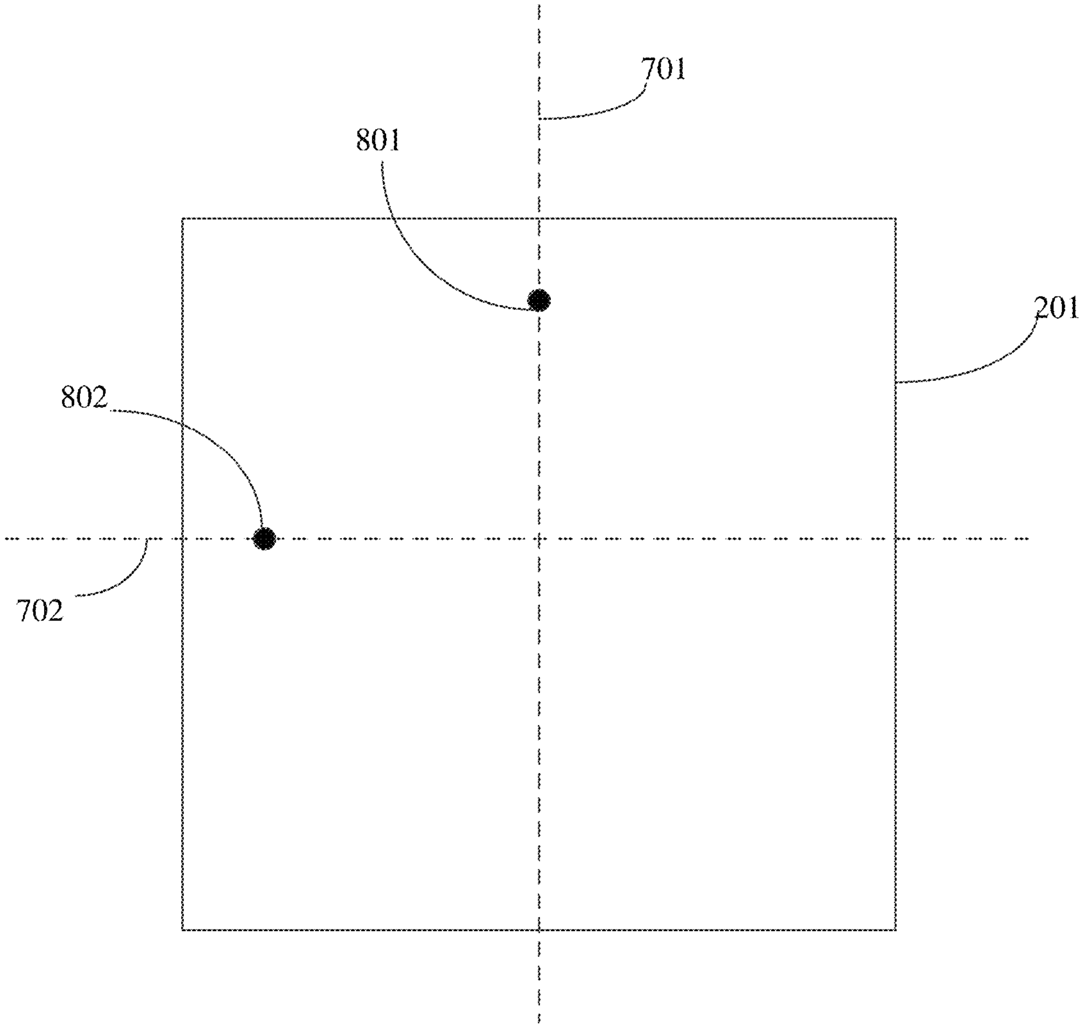
FIG. 12 is a schematic diagram of distribution of a first position and a second position on a radiation piece according to an embodiment of this disclosure.

Optionally, as shown in FIG. 12, the positions of the radiation piece 201 electrically connected to the radio frequency module include a first position 801 and a second position 802. The first position 801 is located on a first axis of symmetry 701 of the square and adjacent to an edge of the square (which means a shortest one of distances from the first position to the four sides of the square is less than a preset value), and the second position 802 is located on a second axis of symmetry 702 of the square and adjacent to an edge of the square (which means a shortest one of distances from the second position to the four sides of the square is less than the preset value). The first axis of symmetry 701 is axis of symmetry formed by folding two opposite sides of the square, and the second axis of symmetry 702 is axis of symmetry formed by folding the other two opposite sides of the square. In other words, the antenna unit in this embodiment of this disclosure adopts an orthogonal feeding manner. This can increase a wireless diversity connection capability of the antenna, reduce the probability of communication disconnection, and improve a communication effect and user experience. In addition, this can help implement a MIMO function, to increase a data transmission rate.

Optionally, the radio frequency module is a millimeter-wave radio frequency module.

The metal plate 1 in this embodiment of this disclosure may also be used as a portion of a radiator of a related-art antenna on the terminal, for example, as a portion of a radiator of a related-art 2G/3G/4G/sub-6G communications antenna. In this embodiment of this disclosure, a millimeter-wave antenna may be integrated into the related-art 2G/3G/4G/sub-6G communications antenna, or the millimeter-wave antenna is compatible with a non-millimeter-wave antenna with a metal frame or metal housing as the antenna, without affecting communication quality of the 2G/3G/4G/sub-6G communication antenna.

An embodiment of this disclosure further provides a high-frequency wireless communications terminal, including the foregoing antenna structure.

Optionally, the high-frequency wireless communications terminal has a housing, where at least portion of the housing is a metal back cover or a metal frame, and the metal plate 1 is a portion of the metal back cover or the metal frame. To be specific, the metal plate 1 may be a portion of a metal housing of the terminal, so that the arrangement of the antenna units does not affect metal texture of the terminal, and the antenna units are well compatible with products with large metal coverage.

Figure 10:
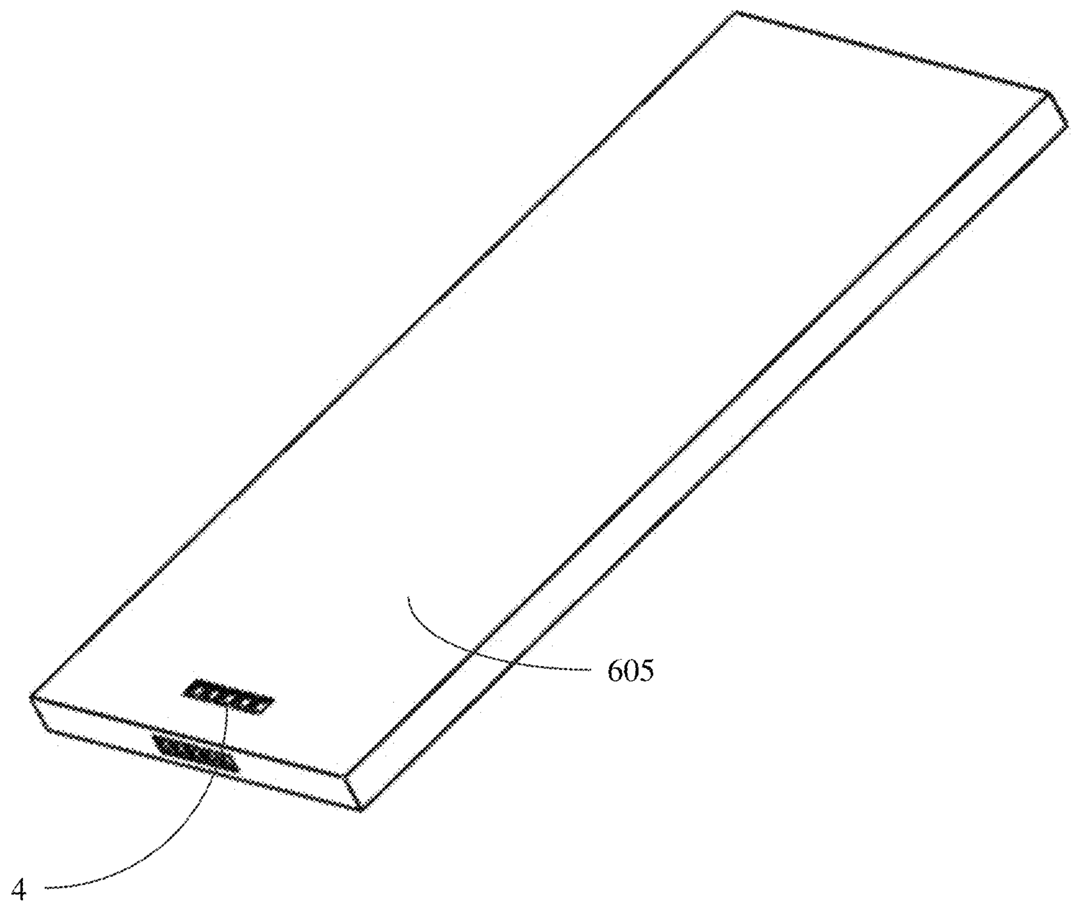
FIG. 10 is a first schematic diagram of a position of an antenna unit disposed on a terminal housing according to an embodiment of this disclosure.
Figure 11:
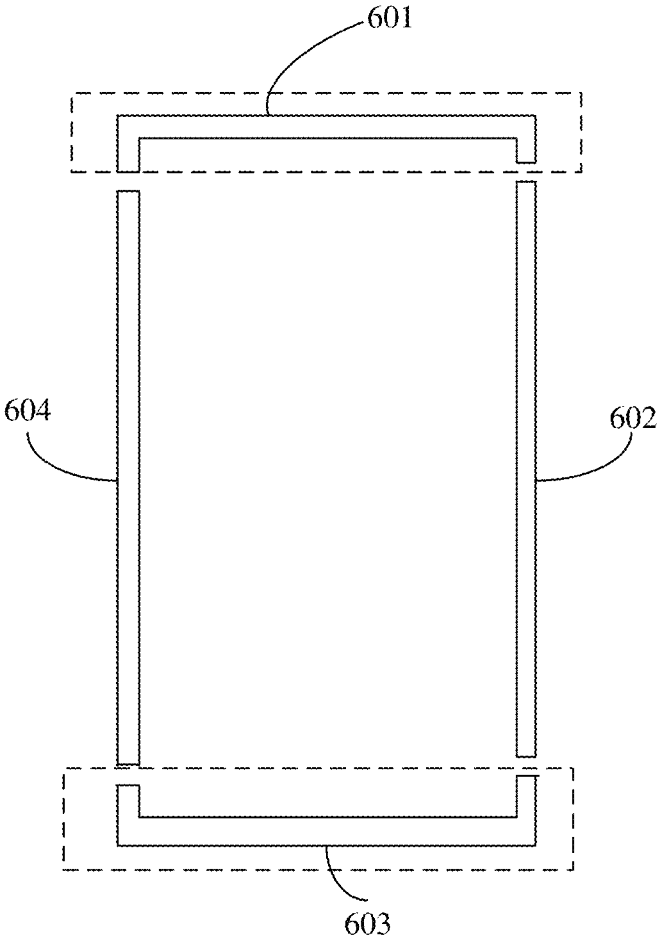
FIG. 11 is a second schematic diagram of positions of antenna units disposed on a terminal housing according to an embodiment of this disclosure.

In addition, the specific distribution of the antenna units on the metal plate 1 can be shown in FIG. 10 and FIG. 11.

For example, as shown in FIG. 11, the housing of the terminal includes a first frame 601, a second frame 602, a third frame 603, a fourth frame 604, and a metal back cover 605. The first to fourth frames enclose a system ground 9. The system ground 9 may include a printed circuit board (PCB), and/or a metal back cover, and/or an iron frame on a screen. The antenna units 4 may be integrated in the metal frames marked by dashed-line boxes in FIG. 11; or, as shown in FIG. 10, the antenna units 4 may be disposed on the metal back cover 605 of the terminal, to increase spatial coverage of an antenna signal and reduce a risk of performance degradation caused by the antenna being blocked, thereby enhancing a communication effect.

The foregoing descriptions are merely optional implementations of this disclosure. It should be noted that a person of ordinary skill in the art may make several improvements or polishing without departing from the principle of this disclosure and the improvements and polishing shall also fall within the protection scope of this disclosure.

What is claimed is:

1. An antenna structure, comprising:

a metal plate, wherein a first accommodating groove is disposed in the metal plate;

a plurality antenna units, wherein each antenna unit comprises a radiation piece and a coupling piece; and a radio frequency module, wherein the radio frequency module is disposed on a first side of the metal plate, and the radio frequency module is electrically connected to each radiation piece; wherein at least one of the radiation pieces and the coupling pieces is disposed in the first accommodating groove, each radiation piece is insulated from the metal plate, each coupling piece is insulated from the metal plate, the radiation piece and the coupling piece of each antenna unit are disposed opposite each other and insulated from each other, the radiation piece is located between the coupling piece and the radio frequency module, the radiation piece is configured to generate a resonance in a first preset band, and the coupling piece is configured to expand a bandwidth of the resonance in the first preset band;

wherein a first insulating dielectric layer is disposed on the radio frequency module, the coupling pieces of the plurality of antenna units are disposed in the first insulating dielectric layer and spaced apart from each other, the radiation pieces of the plurality of antenna units are disposed in the first insulating dielectric layer and spaced apart from each other, and the radio frequency module is installed in the first accommodating groove; and wherein an area of each radiation piece is larger than an area of each coupling piece.

2. The antenna structure according to claim 1, wherein there are a plurality of first accommodating grooves, the plurality of first accommodating grooves are spaced apart from each other, the plurality of antenna units correspond to the plurality of first accommodating grooves, and at least one of the radiation piece and the coupling piece of each antenna unit is disposed in the first accommodating groove corresponding to the antenna unit.

3. The antenna structure according to claim 2, wherein a second insulating dielectric layer is disposed in the first accommodating groove, and the coupling pieces are disposed in the second insulating dielectric layer.

4. The antenna structure according to claim 3, wherein one coupling piece is disposed in the second insulating dielectric layer in one first accommodating groove, and the radiation piece and the coupling piece in a same antenna unit are located in a same first accommodating groove.

5. The antenna structure according to claim 4, wherein a feed pin is disposed on the radio frequency module, and the feed pin is electrically connected to one radiation piece.

6. The antenna structure according to claim 3, further comprising a metal member, wherein the metal member is disposed on the first insulating dielectric layer and located between two adjacent radiation pieces, and the metal member is grounded and in contact with the metal plate.

7. The antenna structure according to claim 6, wherein a pin is disposed on a surface of the metal member, and the pin is in contact with the metal plate; or a convex hull is disposed on a surface of portions of the metal plate between first accommodating grooves, and the convex hull is in contact with the metal member.

8. The antenna structure according to claim 1, wherein the radio frequency module comprises a radio frequency integrated circuit and a power management integrated circuit, and the radio frequency integrated circuit is electrically connected to the radiation pieces and the power management integrated circuit respectively.

9. The antenna structure according to claim 8, wherein the radio frequency module further comprises a first ground layer, a second ground layer, and a third insulating dielectric layer, wherein the third insulating dielectric layer is located between the first ground layer and the second ground layer;

the radio frequency integrated circuit and the power management integrated circuit are located on the second ground layer; and the radio frequency integrated circuit is electrically connected to the power management integrated circuit through a first wire, the radio frequency integrated circuit is electrically connected to the radiation pieces through a second wire, and the first wire and the second wire are located in the third insulating dielectric layer.

10. The antenna structure according to claim 1, wherein each radiation piece and each coupling piece are square, and the first accommodating groove matches each radiation piece and each coupling piece.

11. The antenna structure according to claim 10, wherein each radiation piece and each coupling piece are disposed in parallel, and a straight line passing through a center of symmetry of the radiation piece and a center of symmetry of the coupling piece of each antenna unit is perpendicular to the radiation piece of the antenna unit.

12. The antenna structure according to claim 10, wherein positions of the radiation pieces electrically connected to the radio frequency module include a first position and a second position, the first position is located on a first axis of symmetry of the square and adjacent to an edge of the square, the second position is located on a second axis of symmetry of the square and adjacent to an edge of the square, the first axis of symmetry is axis of symmetry formed by folding two opposite sides of the square, and the second axis of symmetry is axis of symmetry formed by folding the other two opposite sides of the square.

13. The antenna structure according to claim 1, wherein the radio frequency module is a millimeter-wave radio frequency module.

14. A high-frequency wireless communications terminal, comprising an antenna structure, wherein the antenna structure comprises:

a metal plate, wherein a first accommodating groove is disposed in the metal plate;

a plurality antenna units, wherein each antenna unit comprises a radiation piece and a coupling piece; and a radio frequency module, wherein the radio frequency module is disposed on a first side of the metal plate, and the radio frequency module is electrically connected to each radiation piece; wherein at least one of the radiation pieces and the coupling pieces is disposed in the first accommodating groove, each radiation piece is insulated from the metal plate, each coupling piece is insulated from the metal plate, the radiation piece and the coupling piece of each antenna unit are disposed opposite each other and insulated from each other, the radiation piece is located between the coupling piece and the radio frequency module, the radiation piece is configured to generate a resonance in a first preset band, and the coupling piece is configured to expand a bandwidth of the resonance in the first preset band;

wherein a first insulating dielectric layer is disposed on the radio frequency module, the coupling pieces of the plurality of antenna units are disposed in the first insulating dielectric layer and spaced apart from each other, the radiation pieces of the plurality of antenna units are disposed in the first insulating dielectric layer and spaced apart from each other, and the radio frequency module is installed in the first accommodating groove; and wherein an area of each radiation piece is larger than an area of each coupling piece.

15. The high-frequency wireless communications terminal according to claim 14, wherein there are a plurality of first accommodating grooves, the plurality of first accommodating grooves are spaced apart from each other, plurality of antenna units correspond to the plurality of first accommodating grooves, and at least one of the radiation piece and the coupling piece of each antenna unit is disposed in the first accommodating groove corresponding to the antenna unit.

16. The high-frequency wireless communications terminal according to claim 15, wherein a second insulating dielectric layer is disposed in the first accommodating groove, and the coupling pieces are disposed in the second insulating dielectric layer.

17. The high-frequency wireless communications terminal according to claim 16, wherein one coupling piece is disposed in the second insulating dielectric layer in one first accommodating groove, and the radiation piece and the coupling piece in a same antenna unit are located in a same first accommodating groove.

18. The high-frequency wireless communications terminal according to claim 14, having a housing, wherein at least portion of the housing is a metal back cover or a metal frame, and the metal plate is a portion of the metal back cover or the metal frame.

19. The high-frequency wireless communications terminal according to claim 14, further comprising a metal member, wherein the metal member is disposed on the first insulating dielectric layer and located between two adjacent radiation pieces, and the metal member is grounded and in contact with the metal plate.

20. The high-frequency wireless communications terminal according to claim 19, wherein a pin is disposed on a surface of the metal member, and the pin is in contact with the metal plate; or a convex hull is disposed on a surface of portions of the metal plate between first accommodating grooves, and the convex hull is in contact with the metal member.

* * * * *